UNITED STATES PATENT OFFICE.

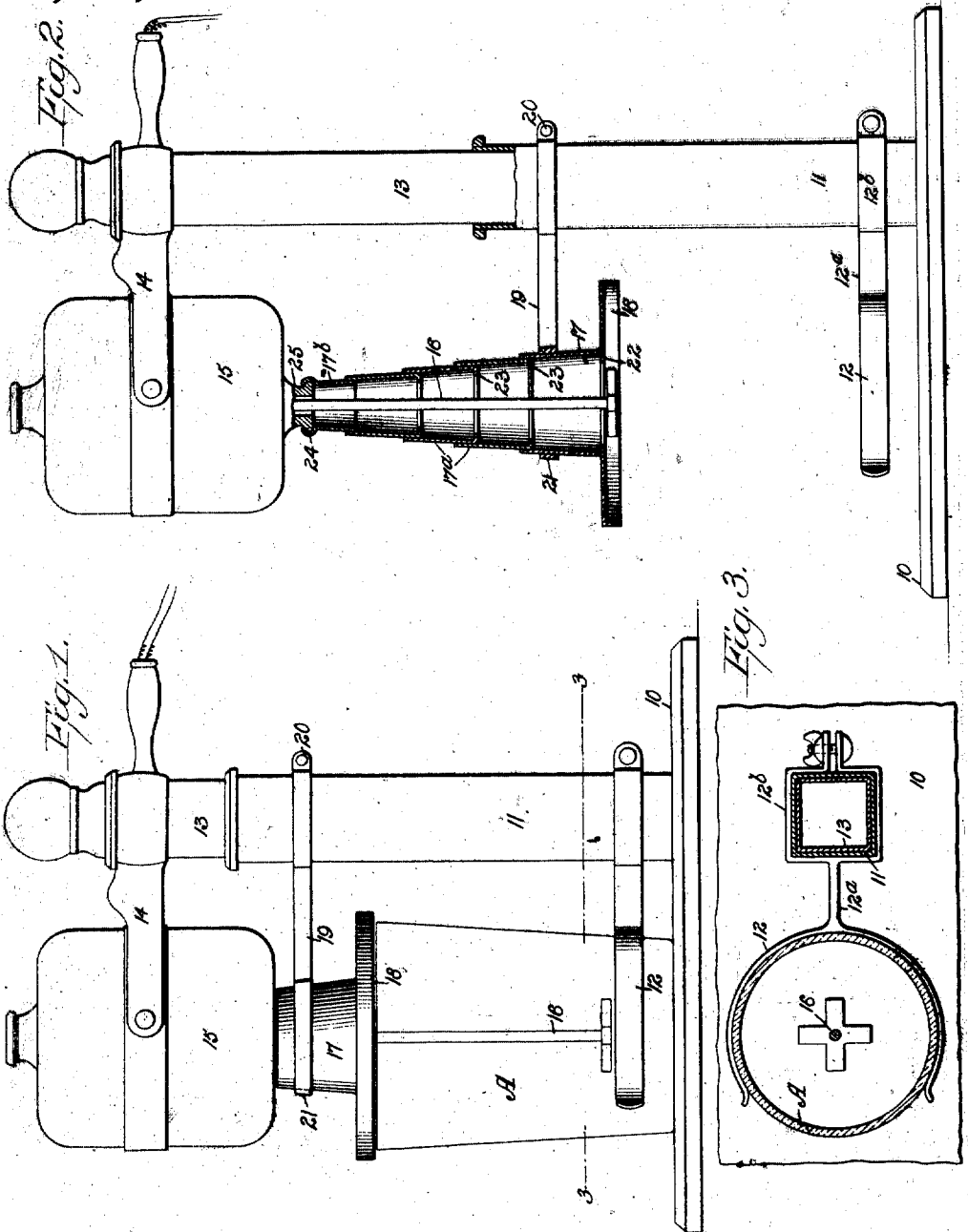

IRVING TIGER, OF FERNDALE, AND ABRAHAM HOCH, OF NEW YORK, N. Y.

ATTACHMENT FOR MIXING-MACHINES.

1,233,823.  Specification of Letters Patent.  Patented July 17, 1917.

Application filed March 21, 1917.  Serial No. 156,404.

*To all whom it may concern:*

Be it known that we, IRVING TIGER, a citizen of the United States, and a resident of Ferndale, in the county of Sullivan and State of New York, and ABRAHAM HOCH, a citizen of the United States, and a resident of the city of New York, borough of Bronx, in the county of Bronx and State of New York, have invented a new and Improved Attachment for Mixing-Machines, of which the following is a full, clear, and exact description.

Our invention relates to machines for mixing malted milk and other beverages and is intended more particularly for embodiment in that type of machine in which a motor-driven mixing spindle is adapted to be lowered into a glass or other receptacle for mixing the contents thereof, and to be raised out of the glass after the mixing operation.

The prime object of our invention is to provide a protective shield for housing the spindle when in the raised position to thereby protect the spindle against contamination by flies and dust.

In carrying out the stated object use is made by us of a collapsible shield which advantageously is associated with a cover for the mixing receptacle, and arranged to be collapsed by the lowering of the mixing spindle to permit the latter to be projected below the shield, the shield being restored with the raising of the spindle to surround the same.

The nature of the invention and the advantages of the structural elements entering into the preferred embodiment thereof will clearly appear as the description proceeds.

Reference is to be had to the accompanying drawings forming a part of this specification in which similar reference characters indicate corresponding parts in all the views.

Figure 1 is a side elevation of a mixing machine having our improved shield applied thereto, the shield being in the collapsed form, and the spindle projected to the lowered mixing position;

Fig. 2 is a sectional side elevation of the machine with our attachment thereon, showing the spindle in the raised position;

Fig. 3 is a horizontal sectional plan view on the line 3—3, Fig. 1.

We have shown our invention applied to a mixing machine which, in its main features, is of known construction, comprising a base 10, on which is a tubular standard 11 having thereon a resilient fork 12 to hold the mixing receptacle A, said fork being shown as sustained by an arm 12ª on a clamp 12ᵇ embracing said standard. The standard 11 slidably receives a vertical post 13 having a supporting yoke 14 thereon carrying an electric motor 15, and a depending mixing spindle 16 adapted to be driven by said motor.

In order to protect the spindle 16 when in the raised position, we provide a shield which in the preferred form includes a fixed tubular section 17 surrounding the spindle and integral with the cover 18 for the receptacle A. The said section is suitably secured to the tubular standard 11 as by an arm 19 clamped as at 20 to the standard and having a ring 21 carrying the said section 17 coaxial with the spindle. The section 17 is slightly tapered or conical and in connection therewith, we employ a series of collapsible sections 17ª, the lower one of which telescopes with the section 17 and the respective sections telescoping with one another. The tapered form of the several sections limit their upward movement and to limit the downward movement, the section 17 has an annular interior flange 22, here shown as a continuation of the cover 18, and similar annular flanges 23 are formed on the section 17ª. The uppermost section 17ᵇ is fixedly secured adjacent to the upper end of the spindle 16 to be raised and lowered thereby, the connection preferably being effected by forming an annular bead 24 on said section 17ᵇ embracing a boss 25 on the motor 15.

By the described construction it will be seen that when the spindle is lowered as in Fig. 1, the shield will collapse, several upper sections telescoping within the lower fixed section 17, leaving the spindle 16 projected into the receptacle A below the cover 18 and that as the spindle is raised to a position shown in Fig. 2, the section 17ᵇ is carried upwardly and raises in succession the several sections 17ᵇ, whereby to house the raised spindle and thereby protect the same against contamination by flies or dirt.

We wish to state in conclusion that although the illustrated example constitutes a practical embodiment of our invention, we do not limit ourselves strictly to the mechanical details herein illustrated, since manifestly the same can be considerably varied without departure from the spirit of the invention as defined in the appended claims.

Having thus described our invention, we claim as new, and desire to secure by Letters Patent:

1. The combination with a mixing machine of the class described, including a mixing spindle, of a protective shield operable by the raising and lowering of the spindle and adapted to house the spindle when the latter is in the raised position, and to assume a form with the spindle projected below the shield when the spindle is lowered for mixing.

2. The combination with a mixing machine of the class described, of a protective shield for housing the mixing spindle while in the raised position, said shield comprising a relatively fixed lower section, and a collapsible upper portion controlled by the raising and lowering of the spindle, said upper portion being adapted to be collapsed by the lowering of the spindle to project the latter for mixing and to be restored to the uncollapsed form for housing the spindle when the latter is raised.

3. The combination with a mixing machine of the class described, of a collapsible shield for the mixing spindle, means fixedly securing the lower end of the shield to permit an axial movement of the spindle relatively thereto, and means to secure the upper end of the shield to be moved up and down with the spindle.

4. The combination with a mixing machine of the class described, of a cover positioned on the mixer to permit a receptacle to be placed beneath the same and sustained so that the mixing spindle of the machine may move axially to said cover, and a protective shield associated with said cover above the same to constitute a housing for the spindle when in the raised position, said shield being collapsible by the lowering of the spindle.

5. A protective shield for the spindle of mixing machines, including a lower section, means to fixedly sustain the same in position on the machine, adjacent to the lower end of the spindle when the latter is in the raised position, collapsible sections above the fixed section, and means to secure the uppermost section adjacent to the upper end of the spindle to be moved with the latter for collapsing the sections, the respective sections having limited relative movement in both directions.

6. A protective shield for the spindle of mixing machines, including a lower section, a cover associated with said section, means to sustain said section and cover in fixed position on the machine, adjacent to the lower end of the spindle when the latter is raised, collapsible sections above the fixed section, said sections having inturned flanges at their lower ends, the lowermost collapsible section telescoping with the fixed section and the several collapsible sections telescoping with one another, the uppermost section having means to secure the same in position adjacent to the upper end of the spindle to be raised and lowered with the movements of the spindle.

IRVING TIGER.
ABRAHAM HOCH.